United States Patent [19]

Nelson

[11] Patent Number: 5,187,985
[45] Date of Patent: Feb. 23, 1993

[54] AMPLIFIED PRESSURE TRANSDUCER

[75] Inventor: Richard W. Nelson, Freeport, Ill.

[73] Assignee: Honeywell Inc., Minneapolis, Minn.

[21] Appl. No.: 762,286

[22] Filed: Sep. 19, 1991

[51] Int. Cl.⁵ .......................... G01L 7/08; G01L 9/06; G01L 19/04
[52] U.S. Cl. ......................... 73/708; 73/721; 73/727; 73/862.623; 338/3; 338/4
[58] Field of Search ............... 73/708, 706, 726, 727, 73/720, 721, 862.622, 766, 862.623, 862.628, 862.627, DIG. 4, 4 R, 754; 128/672, 675; 338/3, 4, 225 D

[56] References Cited

U.S. PATENT DOCUMENTS

| 4,345,477 | 8/1982 | Johnson | 73/766 |
| 4,656,454 | 4/1987 | Rosenberger | 338/2 |
| 5,146,788 | 9/1992 | Raynes | 73/708 |

Primary Examiner—Donald O. Woodiel
Attorney, Agent, or Firm—William D. Lanyi

[57] ABSTRACT

A pressure transducer circuit is provided which includes a bridge arrangement of piezoresistors which are connected to a diaphragm that is sensitive to a pressure which is monitored. The output of the sensor bridge is provided to a preamplifier which is, in turn, associated with an attenuation network and compensation circuitry. The transducer incorporates a plurality of temperature sensitive resistors within the compensation circuit and these temperature sensitive resistors are produced at the same time and during the same manufacturing step as the piezoresistors of the bridge arrangement. In addition, they are produced using the same dopant and are implanted or diffused in the same semiconductor layer as the piezoresistors. The pressure transducer circuit incorporates a plurality of trimmable resistors which are adjusted during a calibration stage to compensate for temperature variations and nonlinearity of the numerous components in the circuit. The present invention eliminates the necessity for the use of thermistors to provide this compensation.

20 Claims, 3 Drawing Sheets

AMPLIFIED PRESSURE TRANSDUCER

BACKGROUND OF THE INVENTION

1. Field of the Invention

The present invention is generally related to an amplifier circuit for use with a pressure transducer and, more particularly, to a circuit which exhibits temperature independence and a high degree of accuracy at very low magnitudes of pressure throughout a wide range of temperatures. The amplifier circuit of the present invention provides an amplifier that can be manufactured less expensively because of its total elimination of the need for thermistors for temperature compensation.

2. Description of the Prior Art

Pressure transducers of many types are well known to those skilled in the art. One particular type of pressure transducer utilizes piezoresistive components in a solid state circuit to measure pressure. The piezoresistors are disposed in a semiconductor material which is shaped in the form of a diaphragm. As the diaphragm is distorted, as a result of pressure against the diaphragm, the conductive characteristics of the piezoresistors change. By monitoring the voltage drop across the resistors, the change in resistivity of these devices can be used to determine the magnitude of the pressure on the diaphragm. For example, U.S. Pat. No. 4,656,454, which issued to Rosenberger on Apr. 7, 1987, describes a piezoresistive pressure transducer with an elastomeric seal. It discloses a low cost piezoresistive pressure transducer that utilizes premolded elastomeric seals. The pressure transducer is particularly adapted for automatic assembly. It provides a means for holding a piezoresistive stress sensitive element in the form of a diaphragm of semiconductor material between a pair of premolded elastomeric seals in a thermoplastic housing. Electrical connections with external circuitry are made with strain relief jumpers which connect conductive regions on the element outside the seals to conductors which pass through the housing wall. FIG. 3 of the patent provides a representative illustration of a solid state piezoresitive sensor device of the general type which is useable in association with the present invention.

U.S. Pat. application Ser. No. 07/630-687, which is titled "RIBBED AND BOSSED PRESSURE TRANSDUCER" and assigned to the assignee of the present application issued to Johnson et al. as U.S. Pat. No. 5,156,052 on Oct. 20, 1992 and discloses a particular physical configuration of a silicon diaphragm used in association with a plurality of piezoresistive devices to improve the sensitivity and accuracy of a pressure transducer of this type. Although the present invention can be utilized with many different types of pressure transducers, the ribbed and bossed pressure transducer described in this patent application is particularly adaptable for use in association with the present invention.

Pressure transducers which utilize piezoresistive components typically experience a nonlinearity in response to temperature fluxuations. As a result, the output voltage signal provided by the pressure transducer is not constant as a function of pressure on the diaphragm if the transducer is subjected to changes in temperature. This problem requires that the transducer be provided with some means for compensating for temperature changes. A typical, and probably the most common, technique for temperature compensation in pressure transducers is to utilize thermistors in the compensation circuit. A thermistor, which is a thermally sensitive solid state semiconducting device that is usually made by sintering mixtures of the oxide powders of various metals, typically requires a ceramic substrate on which the thermistor is deposited by the use of thick film technology. A temperature compensation circuit which utilizes thermistors therefore necessitates the inclusion of a ceramic substrate, or equivalent component, for use in support of the thermistors. Present technology finds difficulty in attempting to produce thermistors in a semiconductor substrate through the use of most known semiconductor manufacturing techniques.

When used in conjunction with piezoresistive components that are implanted or diffused in semiconductor material, the thermistors commonly exhibit temperature coefficients that vary widely, requiring trimming resistors and special temperature testing and trim algorithms during manufacture. Therefore, beside increasing the overall cost of the pressure transducer, the use of thermistors exacerbates the difficulties encountered in providing a temperature compensation circuit for a pressure transducer of this type. In addition, the requirement of a ceramic substrate to support the thermistors of the circuit virtually precludes the further miniaturization of the pressure transducer circuit by preventing the pressure transducer from being entirely manufactured on a single silicon chip.

It would therefore be highly desirable if a pressure transducer can be manufactured with temperature compensation capability without the use of thermistors in the amplification or compensation circuits of the pressure transducer. This would eliminate the need for the thermistors which ar difficult to accurately calibrate and which require the use of a ceramic substrate for their support. The elimination of the need for thermistors would also eliminate the need for the use of thick film technology in association with pressure transducer circuits and would eventually permit the entire pressure transducer, along with its amplification and linearization circuitry, to be manufactured on a minimum number of semiconductor substrates.

SUMMARY OF THE INVENTION

The present invention provides a pressure transducer with temperature compensation for the piezoresistive components of the transducer without requiring the use of thermistors in the compensation circuitry. In a preferred embodiment of the present invention, a pressure sensor apparatus is provided which comprises a sensor device which is responsive to a stimulus to provide an electrical signal. In a most preferred embodiment of the present invention, the sensor device comprises a plurality of piezoresistive components which exhibit a change in resistance as a function of stress. The piezoresistive devices are solid state elements which are implanted into a silicon diaphragm that is subjected to the pressure being monitored. The present invention also comprises a first amplifier circuit that is connected in electrical communication with the sensor device. The first amplifier circuit comprises a first temperature sensitive resistor and a first operational amplifier.

An attenuation network is connected in electrical communication with an output of the first amplifier circuit and is provided with a means for altering the resistance of the attenuation network. In a preferred embodiment of the present invention, the altering means is provided by the use of trimmable resistors. A null set network is provided with a means for altering its resistance which, in a most preferred embodiment of the present invention, comprises a plurality of trimmable resistors.

A preferred embodiment of the present invention also comprises a compensation circuit that is connected in electrical communication with the attenuation network. The compensation circuit comprises second and third operational amplifiers and second and third temperature sensitive resistors. In addition, the compensation circuit of the present invention is provided with a means for altering its resistance which, in a most preferred embodiment of the present invention, is a plurality of trimmable resistors. The present invention, in a preferred embodiment, also comprises a differential amplifier that is connected in electrical communication with the attenuation network, the compensation circuit and the null set network. The differential amplifier comprises a fourth operational amplifier and is configured to provide an output voltage signal which is representative of the magnitude of the measured stimulus, such as the pressure on the diaphragm within the sensor device.

Beside eliminating the requirement for thermistors in the pressure transducer, numerous improvements are provided by the present invention to enable the pressure transducer to possess increased accuracy and sensitivity at very low magnitudes of pressures. Furthermore, the present invention permits a pressure transducer of this type to be made in a much less expensive manner and to be manufactured in a much smaller size than would otherwise be possible if thermistors were used. The present invention also provides a means for increasing the available voltage across the piezoresistive network to permit much higher resolution and accuracy to be achieved.

BRIEF DESCRIPTION OF THE DRAWINGS

The present invention will be more fully understood from a reading of the Description of the Preferred Embodiment in conjunction with the drawings, in which.

DESCRIPTION OF THE PREFERRED EMBODIMENT

Figure 1:
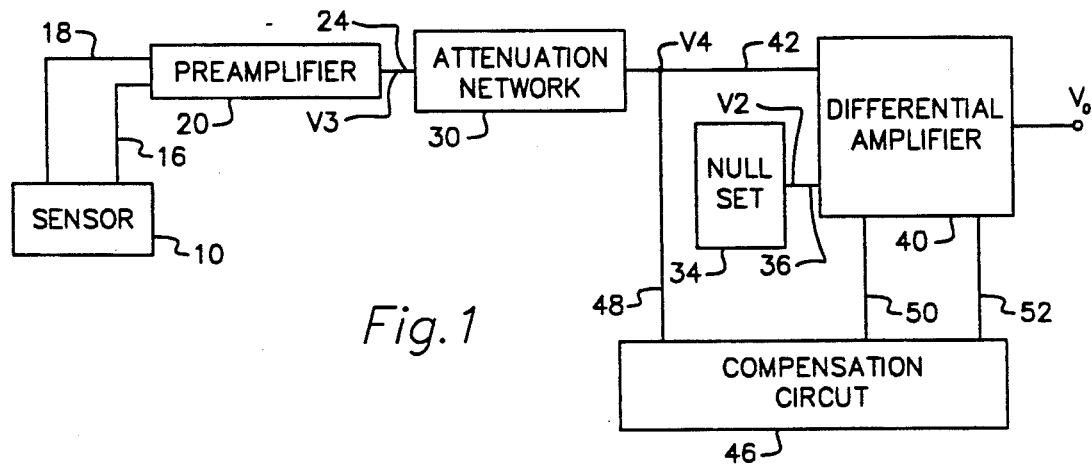
FIG. 1 illustrates a simplified schematic of the present invention.

Throughout the Description of the Preferred Embodiment, like components will be identified with like reference numerals and letters.

FIG. 1 shows a simplified schematic diagram of a pressure transducer made in accordance with the present invention. It comprises a sensor device 10 which is provided with a source voltage by an appropriate power supply. The sensor 10 has two outputs which are provided on lines 16 and 18. The sensor device 10 is connected in electrical communication with a first amplifier circuit, or preamplifier 20. The preamplifier 20 provides an output V3 on line 24 which is also connected to an attenuation network 30.

The attenuation network 30, as will be described in greater detail below, comprises a plurality of trimmable resistors whose resistance value can be altered, during initial calibration, to achieve specific circuit attributes. The specific function of the trimmable resistors in the attenuation network will be described below in relation to the calibration procedure that is utilized during a null compensation procedure. The null set network 34 also comprises a plurality of trimmable resistors which is used to determine the voltage V2 which is provided on line 36 to the differential amplifier 40.

The attenuation network 30 provides a voltage V4 on line 42 to the differential amplifier 40. As will be described in greater detail below, line 42 is connected in electrical communication with the inverting input of an operational amplifier within the differential amplifier 40 and line 36 from the null set network 34 is connected in electrical communication with a noninverting input of the operational amplifier within the differential amplifier. The voltage V4 provided by the attenuation network 30 to the differential amplifier 40 is also connected to the compensation circuit 46 by line 48.

The compensation circuit 46 and the differential amplifier 40 are associated together in electrical communication by lines 50 and 52. As will be described below, lines 50 and 52 are connected to the outputs of two operational amplifiers within the compensation circuit 46. Within the differential amplifier 40, lines 50 and 52 are connected to opposite ends of a series resistor network which provides, at its center, a voltage which is connected to the noninverting input of the operational amplifier in the differential amplifier 40.

It should be understood that FIG. 1 is a simplified schematic diagram of a sensor apparatus made in accordance with the present invention. It should be further understood that for purposes of clarity, certain portions of the circuit are not illustrated in FIG. 1. For example, the power supply which is connected to the sensor device 10, the attenuation network 30, the null set network 34 and the compensation circuit 46 is not shown in FIG. 1. However, it should be clearly understood that each subcircuit which requires power is provided with power from a voltage source. In addition, as will be described in greater detail below in relation to FIG. 2, the sensor device 10, the attenuation network 30, the null set network 34, and a voltage divider network within the compensation circuit 46 are all connected to circuit point of ground potential.

Figure 2:
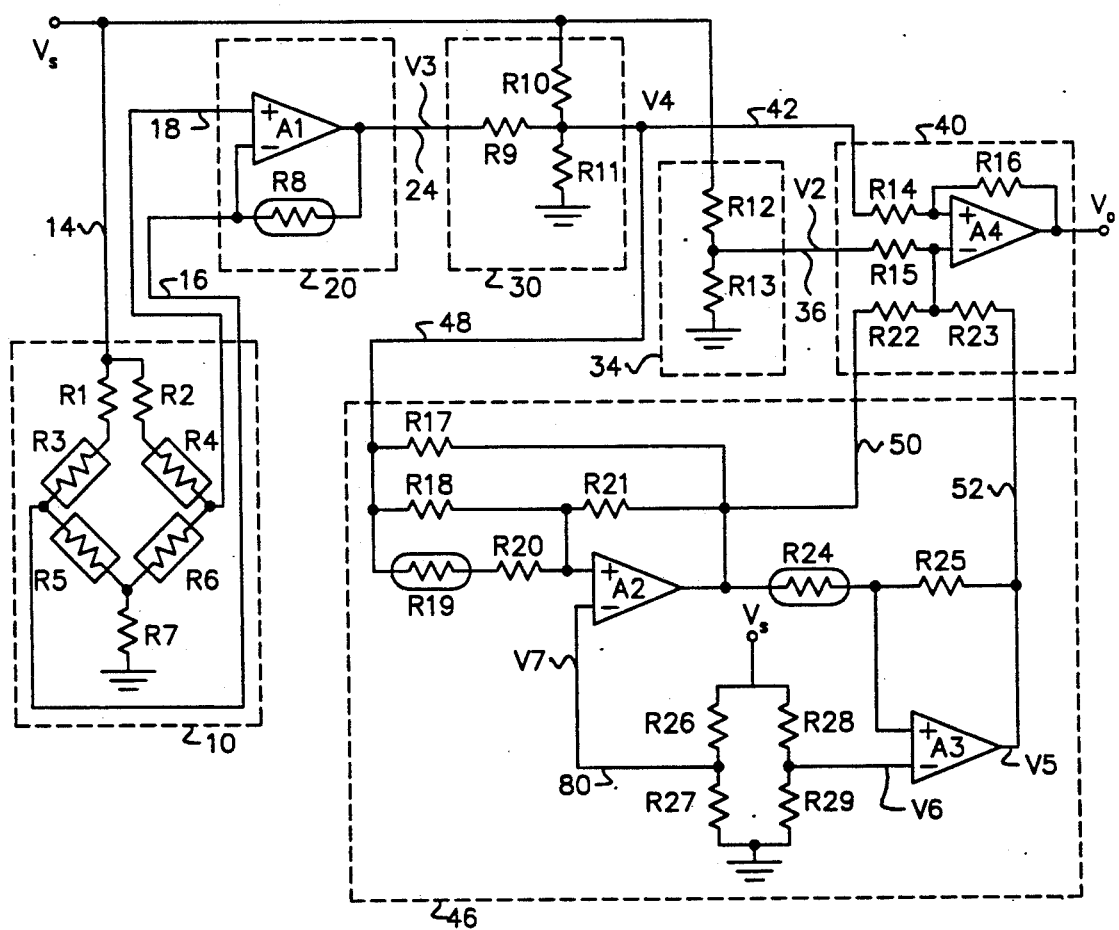
FIG. 2 illustrates a detailed electrical schematic of the present invention illustrated in FIG. 1.

FIG. 2 shows a more detailed electrical schematic representation of the present invention which is illustrated in FIG. 1. The sensor device 10 comprises four piezoresistive components, such as the piezoresistors R3–R6 illustrated in FIG. 2. The piezoresistors are connected in a bridge arrangement as illustrated with resistors R3 and R4 connected through trimmable resistors R1 and R2 to a source of a supply voltage $V_s$ and resistors R5 and R6 connected, through trimmable resistor R7, to a point of ground potential. In a preferred embodiment of the present invention, the piezoresistors R3-R6 are implanted, or diffused, in a semiconductor material, such as silicon, and located on or in connection with a diaphragm which is subjected to a pressure which is to be monitored. The four piezoresistors R3-R6 are illustrated in a rectangular shape to emphasis the fact that these components are the only components in FIG. 2 which are placed on or in stress communication relation with the diaphragm of a solid state pressure sensor.

Also shown within the sensor device 1 in FIG. 2 are several trimmable resistors, R1, R2 and R7. Since it is expected that piezoresistors R3-R6 will not be precisely identical in resistance to each other, trimmable resistors R1 and R2 allow slight alterations in the resistances of the legs within the bridge. In a preferred embodiment of the present invention, resistor R7 is initially sized to be approximately half the resistance of either resistor R1 or R2 which are initially equal to each other. As can be seen in FIG. 2, lines 16 and 18 are connected in electrical communication with the junction of piezoresistors R3 and R5 and the junction of piezoresistors R4 and R6, respectively. As the resistances of the piezoresistors change in response to a stimulus such as pressure, the bridge becomes unbalanced to permit the stimulus to be measured.

The preamplifier 20 comprises a first operational amplifier A1 and a temperature sensitive resistor R8. Throughout the description of FIG. 2, it should be understood that resistors R8, R19 and R24 are located within the same semiconductor material as the piezoresistors R3-R6. In other words, if the piezoresistors are disposed within the epitaxial layer of a semiconductor device, resistors R8, R19 and R24 would be located in that same epitaxial layer. In addition, the temperature sensitive resistors R8, R19 and R24 are also produced through the use of the same techniques used to produce the piezoresistors and at the same time. The purpose for these similar procedures is to assure that the characteristics of the temperature sensitive resistors R8, R19 and R24 are the same as those of the piezoresistors R3-R6. As is well known to those skilled in the art of semiconductor manufacture, resistors which are disposed in semiconductor material, such as silicon or the epitaxial layer of a silicon device, exhibit variations in both resistive value and temperature dependent characteristics. For example, the intended resistance of a diffused resistor may vary as much as plus or minus 15 percent and the temperature coefficient of the device may also vary from one production run to another. However, the components manufactured during a specific production run are generally very consistent and similar to each other in these characteristics. For this reason, it is important that the temperature sensitive resistors R8, R19 and R24 possess very similar characteristics to the piezoresistors R3-R6. To identify these temperature sensitive resistors, they are each illustrated as an oblong shape in FIG. 2. In addition, to illustrate the piezoresistors, which are the only components disposed on the diaphragm of the semiconductor device, those elements are illustrated as rectangular components. All of the other resistors shown in FIG. 2 should be considered to have zero or negligible temperature coefficients and should also be considered to be trimmable so that their individual resistance values can be altered during production and calibration of the pressure transducer.

The operational amplifier A1 of the preamplifier 20 is connected, at its noninverting input, to line 18. The inverting input of operational amplifier A1 is connected to line 16 as shown. A temperature sensitive resistor R8 is connected between the inverting input and the output of operational amplifier A1. Because of the characteristics of the circuit shown in the preamplifier 20, the operational amplifier will serve to maintain equal voltages at its inputs by feeding current into the bridge of the sensor device 10 through line 16. Therefore, as the pressure on the diaphragm changes, the voltage output of operational amplifier A1 changes to drive the bridge toward a balanced voltage condition. Therefore, temperature sensitive resistor R8 in conjunction with R3 and R5 determines the instantaneous gain of amplifier A1.

An advantage of the circuit shown in FIG. 2 is that it provides a very high input impedance so that the bridge circuit of the sensor device 10 is not loaded. In other words, operational amplifier A1 has only very small loading currents flowing from the sensor bridge at an time.

In a preferred embodiment of the present invention, the resistance magnitude of temperature sensitive resistor R8 is four times the value of the resistance of any one of the piezoresistors R3-R6. In view of the fact that the sensitivity of the transfer function of the preamplifier 20 and sensor device 10 (hereinafter referred to as the "gain" of operational amplifier A1) is a function of 0.5 plus two times the value of resistor R8 divided by the value of any one of the piezoresistors R3-R6, the gain of the operational amplifier A1 is approximately 8.5 at the preamplifier stage. This provides a gain and enables the present invention to accurately measure pressures which are very low. It should be noted however that the temperature coefficient of resistor R8 must be over similar to the temperature coefficient of piezoresistors R3-R6 if the gain of the preamplifier circuit is to remain constant over a relatively large temperature range. Therefore, as discussed above, temperature sensitive resistor R8 should be produced in the same silicon and processed at the same time and during the same step of manufacturing as the piezoresistors R3-R6. In other words, if the piezoresistors R3-R6 are implanted into the epitaxial layer of a silicon substrate, temperature sensitive resistor R8 should be implanted into that same epitaxial layer during the same step of manufacturing and using the same dopant to achieve the same temperature coefficient.

The output of the operational amplifier A1, which is also illustrated as the output of the preamplifier 20, is identified as V3. This voltage, on line 24, is provided as an input to the attenuation network 30. It should be understood that the magnitude of the voltage signal V3 decreases as the pressure on the piezoresistors R3-R6 increases.

As is well known to those skilled in the art, when the pressure on the diaphragm increases the resistances of an opposite pair of piezoresistors increases while the resistance of the other pair of piezoresistors decreases due to the orientation of the resistors R3-R6 on the diaphragm of the pressure transducer. For example, an increase in pressure would be expected to raise the resistance of piezoresistors R4 and R5 while decreasing the resistance of piezoresistors R3 and R6. Therefore, the ratio of $\Delta R/R$ is a function of some value K times the pressure on the diaphragm as shown by the relationship $$\Delta R/R = K*P \tag{1}$$

where K is a function of temperature, R is the value of any one of the resistors R3-R6 at null pressure and $+/-R$ is the change in R due to a change in pressure and $\Delta R/R$ is the input signal proportional to pressure P. In other words, the piezoresistors R3-R6 will exhibit different resistances at different temperatures for the same pressure on the diaphragm.

With reference to the attenuation network 30, it should be understood that trimmable resistors R10 and R11 are altered during manufacture to set voltages V3 and V4 equal to each other at null pressure. This is done to prevent current from flowing through resistor R9 when a null pressure is imposed on the diaphragm so that resistor R9 can be trimmed to adjust the output voltage at full scale pressure without changing the output voltage at null pressure.

With reference to the compensation circuit 46, trimmable resistors R26 and R27 are altered to provided a voltage V7 which causes the output voltage V1 of operational amplifier A2 to be equal to voltage V4.

If the magnitude of voltage V7 is appropriately set to make voltages V1 and V4 equal to each other, no current will flow through temperature sensitive resistor R19 when a null pressure is imposed on the diaphragm of the piezoresistor. With continued reference to the compensation circuit 46, it should be understood that trimmable resistors R28 and R29 are set to make the output of operational amplifier A3, which is identified as voltage V5, equal to the output of operational amplifier A2 which is identified as voltage V1. This equality between signals V5 and V1 results in no current flowing through temperature sensitive resistor R24 when a null pressure is imposed on the diaphragm.

In a preferred embodiment of the present invention, trimmable resistors R12 and R13 of the null set network 34 are used to provide a voltage V2 on line 36 which causes operational amplifier A4 of the differential amplifier 40 to provide a voltage output $V_o$ which is a predetermined value at a null pressure on the diaphragm. For example, if it is desired to have a voltage output of 1.0 volts at null pressure, trimmable resistors R12 and R13 are adjusted to set that value of $V_o$ by altering the magnitude of signal V2 on line 36. For proper common mode rejection within the differential amplifier 40, the resistance of trimmable resistors R15 and R16 ar set approximately equal to each other while the resistance of trimmable resistor R14 is set equal to the combined parallel resistance of resistors R22 and R23. However, it should also be understood that resistors R22 and R23 are trimmed to be equal to each other.

The procedures described above are performed with a null pressure on the diaphragm of piezoresistors R3-R6. Those procedures result in the fact that no current passes through resistor R9 in either direction because of the equality of voltages V3 and V4 at null pressure. After the null pressure compensation procedures are performed, the pressure on the diaphragm is increased during the calibration operation to its full scale pressure. After the full scale magnitude is imposed on the diaphragm, trimmable resistor R9 is altered to provide the desired output signal $V_o$ for full scale operation of the pressure transducer.

If the device shown in FIG. 2 is not expected to operate over a range of temperatures, the calibration procedure would be complete after having performed the operations discussed above. However, as is well known to those skilled in the art, it is necessary that a pressure transducer be able to perform over a wide range of temperatures while providing accurate output signals that represent the pressure on the diaphragm. This requirement is especially severe when the pressure transducer is expected to monitor very low magnitudes of pressure on the diaphragm. The procedures of temperature compensation will be described below.

An empirical procedure is performed to measure several relevant voltages within the circuit of FIG. 2 at null pressure and at full scale pressure at the temperature extremes. In addition, the magnitude of voltage V7 is artificially and temporarily altered at both null pressure and full scale pressure in order t determine the effect that this momentary alteration of signal V7 has on the magnitude of the output signal $V_o$ with respect to temperature. It should be noted that operational amplifiers A2 and A3 are inverting amplifiers and, therefore, as voltage V1 rises, voltage V5 will decrease and vice versa.

It should be understood that temperature sensitive resistors R19 and R24 have a relatively wide tolerance of resistance, similar to the piezoresistors R3-R6, because they are diffused in silicon. This potentially large variation in the resistive magnitudes of resistors R19 and R24 is normally intolerable in circuits of the type illustrated in FIG. 2. However, as shown within the compensation circuit 46 in FIG. 2, trimmable resistors R18 R20 and R21 are provided to permit their magnitudes to be altered for the purpose of maintaining the designed gain of operational amplifier A2. Similarly, temperature sensitive resistor R24 is expected to have a relatively wide variation in resistance because it is also diffused in silicon. For this reason, trimmable resistor R25 is provided to account for these variation and to correct for them during calibration.

Figure 3:
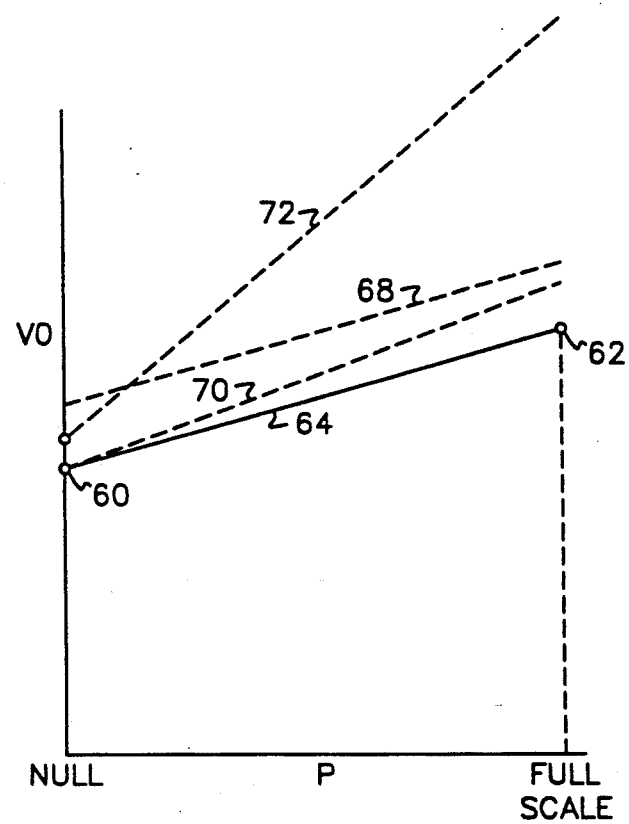
FIG. 3 represents an illustration of the variations caused by temperature in the relationship between the voltage output of a transducer and the measured pressure.

In order to understand the difficulties in providing temperature compensation for a pressure sensor device 10 such as that shown in FIG. 2, reference is made to FIG. 3 which illustrates the type of problems encountered because of the wide variation of overall temperature sensitivity of the device 10. In FIG. 3, the voltage output $V_o$ of the differential amplifier 40 is shown graphically as a function of the pressure on the diaphragm. The point identified by reference numeral 60 represents the output voltage $V_o$ that was determined at null pressure by adjusting resistors R12 and R13 of the null set network 34. The point identified by reference numeral 62 represents the magnitude of the output voltage $V_o$ determined by trimming resistor R9 when full scale pressure was imposed on the diaphragm. This results in line 64 which represents the output voltage $V_o$ as a function of P. However, it is very important to understand that the relationship represented by line 64 depends on the temperature being constant. If the temperature varies, the slope and intercept point of line 64 can change in magnitude and direction in a way which is very difficult to predict. In other words, the slope of line 64 may remain constant at elevated temperatures while the null intercept increases. This possibility is illustrated by dashed line 68. Alternatively, the null pressure intercept may remain constant when the temperature changes while the slope of the system changes as shown by dashed line 70. Furthermore, both the slope and the intercept magnitude can change as illustrated by dashed line 72 in FIG. 3. Before describing the temperature compensation procedures related to the present invention, it should be understood that as the pressure on the diaphragm rises, voltage V3 decreases, output voltage $V_o$ increases, voltage V4 decreases, voltage V1 increases and voltage V5 decreases. It should also be understood that, as discussed above, voltages V1 and V5 change in opposite directions when the pressure on the diaphragm changes.

During the null pressure calibration described above, it was mentioned that the magnitude of voltage V7 was temporarily and artificially changed in order to determine the effect of that change on the magnitude of the output voltage $V_o$. In order to accomplish that change, a known accurate resistance is first connected between the power supply and the circuit point between resistors R26 and R27. This raises the magnitude of voltage V7 by decreasing the effective resistance between line 80 and the power supply of the supply voltage VS. Then, the known resistance is connected between line 80 and a circuit point of ground potential. This effectively decreases the value of voltage V7 by decreasing the effective resistance between line 80 and ground potential. Again, the effect on the output voltage $V_o$ is measured and recorded. These alterations of voltage V7 are performed at several different temperatures while a null pressure is imposed on the diaphragm. This data therefore describes three specific relationships. One is the relationship between the output voltage $V_o$ at null pressure as a function of temperature. In addition, the data provides the relationship between the altered V7 magnitude and the magnitude of the output voltage $V_o$ over temperature when the magnitude V7 is increased. Similarly, the same information is provided when the magnitude of voltage V7 is decreased. Since the overall goal of the temperature compensation procedure is to achieve a relationship where the output voltage $V_o$ at null pressure does not change as a function of temperature, the three relationships described above are examined to determine which two of those relationships are closest to and on opposite sides of a horizontal line when the three relationships are plotted graphically as lines with the output voltage $V_o$ represented as a function of temperature. The two relationships which have been chosen, because they most closely encompass a horizontal line between them, are mathematically compared to determine the value of voltage V7 which will result in a constant output voltage $V_o$ for all temperatures at null pressure. When this magnitude of voltage V7 is determined, trimmable resistors R26 and R27 are altered to achieved that desirable voltage V7 at null pressure on the diaphragm. This alteration of voltage V7 will create a situation in which temperature sensitive resistor R19 and R24 have current flowing through them at null pressure, but operational amplifier A2 will react to that current and operate to balance its inputs. This reaction by operational amplifier A2 will also affect the magnitude of its output voltage V1. However, voltage V1 is connected in association with voltage V5 to the divider network R22 and R23 which assures that the average value of voltages V1 and V5 is the effective noninverting input voltage of operational amplifier A4. Therefore, the reaction of operational amplifier A2 will cause operational amplifier A4 to compensate for temperature change by providing an output voltage $V_o$ which is generally constant for all temperatures when a null pressure is imposed on the diaphragm.

Figure 4:
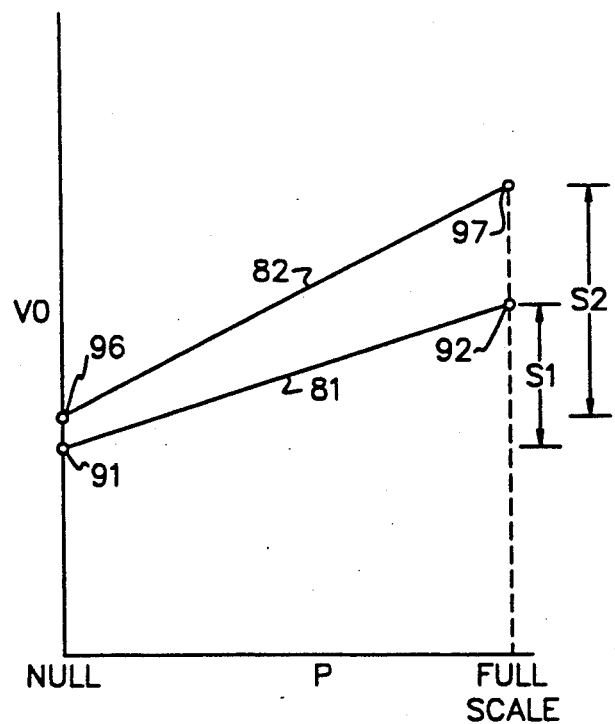
FIG. 4 illustrates potential changes in the relationship between the voltage output and pressure as a result of temperature change.

It should be noted that the temperature characteristics of the components in any pressure transducer will probably also affect the relationship between the output voltage $V_o$ and the pressure on the diaphragm. Even though the null pressure output has been compensated through the procedures described above, some means must be provided to also compensate for the adverse effects that temperature can have on the relationship between the output voltage and the pressure on the diaphragm for pressures other than the null pressure. The relationship between the output voltage $V_o$ and the pressure on the diaphragm of the piezoresistors R3-R6 can be considered as being generally a straight line with a slope and a null intercept. With reference to FIG. 4 and to the relationship $$VO = m*P + b \qquad (2)$$

the output voltage $V_o$ is shown expressed as a straight line function of the pressure P multiplied by the slope m and increased by the null pressure offset b. In FIG. 4, line 81 represents the relationship between the output voltage and the pressure on the diaphragm at a first temperature and line 82 represents that same relationship at a second temperature. However, it should also be understood that a change in temperature in one direction can cause the line 81 shown in FIG. 4 to move in either direction, depending on the temperature characteristics of the various components in the circuit. The span of line 81 is illustrated a S1 and the span of line 82 is illustrated as S2. In order to compensate for the changed slope m in the line from the position of line 81 to that of line 82, resistors R18, R20 and R21 are trimmed to compensate for the change in slope resulting from a change in temperature. The information necessary to perform these calculations is taken during the initial calibration procedures where the plurality of voltages are measured and recorded at both null pressure and full scale pressure at several temperatures. This data is then analyzed to determine the appropriate values for each of the trimmable resistors. Although each application must be determined individually based on the empirical data taken during the calibration examination, it can be stated generally that if the slope of the line in FIG. 4 rises, resistor R18 can be trimmed to compensate for that rise while resistors R20 and R21 can be trimmed to compensate if the slope of the line in FIG. 4 decreases as a function of temperature. These adjustments to the trimmable resistors R18, R20 and R21 are intended to adjust the effect that resistor R19, which is a temperature sensitive resistor, has on the gain of operational amplifier A2 as a function of temperature change.

In a preferred embodiment of the present invention, the operational amplifiers A1-A4 are type LM124 or LMC660 which are both available in commercial quantities from the National Semiconductor Corporation. Type LM124, which is a linear bipolar operational amplifier, is used in applications of the present invention which have a supply voltage VS that is approximately 8 volts. Type LMC660, which is a CMOS operational amplifier, is used in association with the present invention for applications in which the supply voltage VS is approximately 5 volts.

By providing the compensation capabilities described above, a pressure transducer made in accordance with the present invention does not require the use of thermistors for either span or null temperature compensation. In addition, it should be understood that the compensation is not accomplished in the bridge circuit of the sensor device 10. Therefore, the full supply voltage VS is available across the sensor bridge of piezoresistors R3-R6. This maximizes the sensitivity of the transducer and permits it to be used with very low pressures. The temperature compensation is implemented with temperature sensitive resistors which are produced in the same semiconductor layer as the piezoresistors connected to the diaphragm. In addition, they are produced at the same time and with the same materials to achieve generally identical temperature coefficients. The circuit of the present invention is provided with numerous trimmable resistors to permit the circuit to be accurately calibrated and adjusted for accurate compensation of the temperature effects on its components.

Operational amplifier A1 is a preamplifier that performs the overall functions of differential to single ended transformation and has a high input impedance to avoid unnecessary loading of the bridge piezoresistors. As discussed above, voltage V3, at the output of operational amplifier A1, is a function of the supply voltage VS, the magnitude of the resistor R8, and the relative change in resistance $\Delta R/R$ at the bridge. This relationship is shown below $$V3 = VS(0.5 + (0.5 + 2*R8/R)*\Delta R/R) \quad (3)$$

where $\Delta R/R$ is the percentage resistance change which is proportional to the pressure on the diaphragm. This results in a effective gain of $(0.5 + 2*R8/R)*VS$ for the preamplifier 20. At null pressure, voltage V3 is approximately equal to one half of the supply voltage VS.

Within the sensor device 10, trimmable resistors R1 and R2 have a relatively low resistance and are used to null or balance the bridge and the operational amplifier input offset errors. One of these two trimmable resistors is altered at null pressure until voltage V3 is equal to one half of the supply voltage VS. Resistor R7 is equal to one half of the magnitude of resistor R1, or R2, to minimize common mode temperature change which could be caused by different temperature properties of resistors R3, R4, R5 and R6 versus those of resistors R1, R2 and R7.

The null output voltage $V_o$ of the transducer can be set by trimming either of the resistors R12 or R13. The span of the transducer is determined by trimming resistor R9 according to the procedures described in greater detail above. Resistors R9, R10 and R11 form an attenuation network 30 which permits resistor R9 to be used to set the span instead of the less desirable alternative of using amplifier gain resistors that must match each other for common mode rejection. In addition, the compensation circuitry will operate at the same voltage levels for sensor process sensitivity variations since the span attenuation network is located at the input to the compensation circuitry. Resistors R10 and R11 are trimmable and are altered so that voltage V3 is equal to voltage V4 at null pressure. This permits resistor R9 to be trimmed to adjust the span without altering the null.

Because of the fact that compensation resistors R19 and R24 are temperature sensitive and are primarily used for span compensation, an initial trim at zero pressure is performed to adjust voltage V7 and voltage V6 to assure that voltage V1 is equal to voltage V4 and, in addition, to assure that voltage V5 is equal to voltage V1. This results in no current flowing through these temperature sensitive resistors at null pressure. As a result, the null output voltage will not change with temperature due to the amplifier circuit. Since resistors R19 and R24 are silicon diffused or implanted resistors which usually have a wide tolerance and are used in the gain circuitry of operational amplifiers A2 and A3, the other gain resistors of these operational amplifiers are trimmed to specific ratios to achieve consistent gain from part to part. For example, as described above, resistor R24 is measured and resistor R25 is trimmed so that the ratio of these resistors is maintained at a desirable value. Similarly, resistors R18, R20 and R21 are trimmed to specific ratios of temperature sensitive resistor R19. The differential output gain stage operational amplifier A4 requires that the resistances of resistors R15 and R16 be generally equal and that the resistances of resistors R22 and R23 be generally equal. In addition, the resistance of resistor R14 should be equal to one half of the resistance of R23 for proper common mode rejection. As a result, the gain of operational amplifier A4 is equal to the ratio of resistor R16 to resistor R14.

In a preferred embodiment of the present invention, the span compensation is accomplished by adjusting the gain resistor ratios of operational amplifier A2. For example, if the span increases with temperature, resistor R18 will be trimmed to a higher value. Similarly, if the span is negative with temperature, resistors R20 and R21 are trimmed to higher values.

The desired voltage V7 is determined, from empirical data taken at different temperatures, and the magnitude of voltage V7 is achieved by trimming resistors R26 or R27. The result of this trimming operation is that the current through the temperature sensitive resistors R19 and R24 at null pressure can be changed in magnitude and direction to create a null temperature change in the amplifier circuit to counter balance that of the sensor bridge. Because of the interaction of the span compensation trim on the null compensation, the null compensation is calculated mathematically and adjusted as required.

The compensation circuitry of the present invention also includes the nonlinear temperature characteristics of resistance and pressure sensitivity of the pressure sensitive and compensation resistors. If the compensation circuitry is perfectly linear, the transducer would exhibit approximately a 1.2 percent span temperature error which, in cases where accuracy is important, is unacceptable. Voltage V3, at the output of operational amplifier A1, exhibits a nonlinear temperature slope. This voltage is provided, through the attenuation network 30, to the inverting input of operational amplifier A4 in the differential amplifier 40. This output is also connected to the inverting amplifier A2. As can be seen in FIG. 2, one of the input gain resistors of operational amplifier A2 is resistor R19 which is a nonlinear temperature sensitive resistor. Therefore, as temperature increases, resistor R19 increases in a nonlinear fashion and the gain of operational amplifier A2 deceases in a likewise nonlinear manner. The output of operational amplifier A2 is connected to another inverting amplifier A3 which also has a nonlinear temperature sensitive gain resistor R24 connected to its input circuit. As a result, the gain of operational amplifier A3 also decreases in a nonlinear fashion as temperature increases. When the gains of operational amplifiers A2 and A3 are properly selected and adjusted for temperature slope magnitude with resistors R18, R20 and R21, the nonlinear temperature properties of the pressure sensor bridge can be compensated. Furthermore, packaging effects, process variations and mismatch error sources can be compensated to produce an accurate amplified output voltage with respect to temperature variations. Since the circuit of the present invention does not require the use of thermistors, it can be manufactured with discrete resistors, printed ceramics, chrome-silicon resistors on silicon substrate or it ca be fully integrated.

Figure 5:
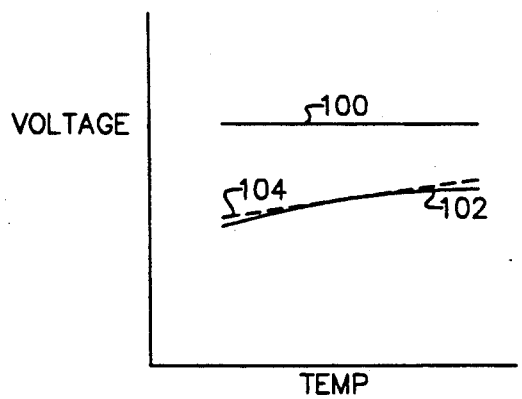
FIG. 5 shows the relationship between the voltage level and temperature at null and full pressure for the preamplified signal V4.

FIG. 5 shows the relationship between temperature and the preamplified output voltage V4 from the sensor 10, which is also the input voltage to the compensation circuit 46. The null pressure relationship, shown by line 100, shows that the bridge resistor R3–R6 and resistor R8 all have generally identical temperature coefficients of resistance, or TCR's, because they are all made at the same time and under the same conditions. However, line 102 shows that the response of the bridge resistors R3–R6 to change in pressure itself changes as a function of temperature. The curvature of line 102 is exaggerated in FIG. 5 to emphasize this characteristic. Dashed straight line 104 is provided to illustrate the curvature of line 102, which is both curved and sloped. This illustrates the variability of the value K in the relationship shown in equation 1 above. It should be noted that, at null pressure, voltages V1, V4 and V5 are all equal to each other as a result of the preliminary adjustments described above.

Figure 6:
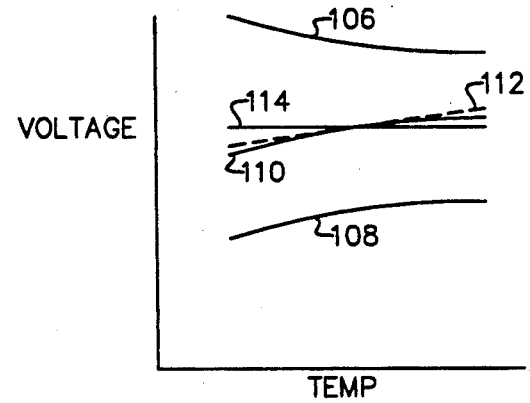
FIG. 6 shows the relationship between the average effective voltage ((V1+V5)/2) and individual voltages V1 and V5 at null and null pressure.

FIG. 6 shows the relationships of V1 and V5, at both null and full pressure, as a function of temperature. In FIG. 6, line 106 represents voltage V1 as a function of temperature and line 108 represents voltage V5 as a function of temperature. Line 106 is both curved and sloped because voltage V1 is an output of operational amplifier A2 which has V4 as an input to its circuit which is also affected by the temperature sensitivity of resistor R19. The inverting nature of amplifier A2 causes the direction of slope of line 106 to be opposite to that of line 102. Since V1 is used to provide an input to amplifier A3, in association with temperature sensitive resistor R24, the curvation of line 108 is more pronounced than line 106 and, because voltage V5 is the output of an inverting amplifier, its slop is opposite to that of line 106. Line 110 illustrates the average of lines 106 and 108. Straight dashed line 112 is used to demonstrate the curvature of line 110, which is exaggerated in FIG. 6 for purposes of illustration. Lines 106, 108 and 110 represent the temperature sensitivities of their respective parameters at full operating pressure. Line 114 shows the temperature sensitivity of either V1 or V5 at null pressure.

Figure 7:
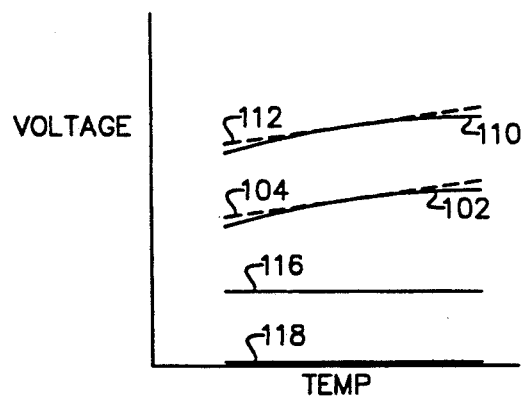
FIG. 7 illustrates the relative magnitudes, slopes and curvature of the curves shown in FIGS. 5 and 6.

With reference to FIGS. 5 and 6, it can be seen that lines 102 and 110 are similarly sloped and shaped, but of distinctly different magnitudes of voltage. These lines are reproduced in FIG. 7. The average value of V1 and V5, represented by line 110, is the effective noninverting input to the circuit of differential operational amplifier A4. V4, which is represented by line 102, is the inverting input to the circuit of differential operational amplifier A4. Line 116 shows the algebraic difference between lines 102 and 110 which is, as can be seen in FIG. 7, a straight and horizontal line. This indicates that the difference between the average effective input to amplifier A4, which is the average of V1 and V5, and the other input to amplifier A4 is independent of temperature change. Line 118 represents this temperature independence at null pressure while line 116 represents this temperature independence at full operating pressure. Because of the equality of V1, V4 and V5 at null pressure the magnitude of line 118 is zero.

Figure 8:
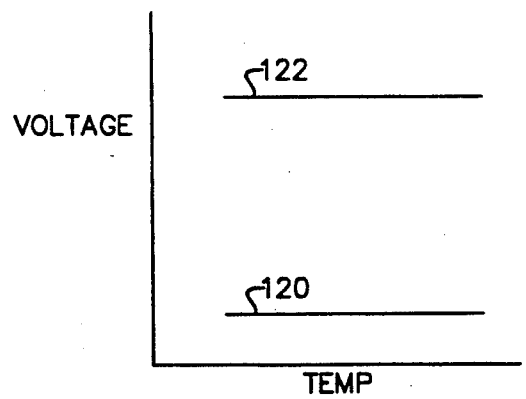
FIG. 8 shows the offset and amplified versions of the differences between V4 and (V1+V5)/2 at full and null pressure as a function of temperature.

In FIG. 8, line 120 represents the result of adding an offset voltage to line 118 as a result of the null set network 34 which adds a predetermined magnitude to the output voltage of amplifier A4 at null pressure. Line 122 represents the magnification of line 116 by the amplifier circuit 40 added to the null offset value of line 120. Line 120 represents the voltage output of amplifier A4 at null pressure and line 122 represents the voltage output of amplifier A4 at full operating pressure.

FIGS. 5–8 illustrate the process by which the present invention results in temperature independent outputs (i.e. lines 120 and 122) although the intermediate variables (i.e. lines 102 and 110) are highly temperature dependent. The raw sensor output V4, although highly temperature sensitive, is processed by the present invention to create the effective average value of V1 and V5, between resistors R22 and R23, which is shaped and sloped similar to line 102. This permits the algebraic difference between these values (i.e. lines 102 and 110) to be used to provide a temperature independent output of operational amplifier A4.

Although the present invention has been described with significant specificity and particular embodiments of the present invention have been illustrated with considerable detail, it should be understood that alternative embodiments of the present invention should be considered within its scope.

The embodiments of the invention in which an exclusive property or right is claimed are defined as follows:

1. A pressure sensor apparatus, comprising:
   a sensor device, said sensor device being responsive to a stimulus to provide an electrical signal;
   a first amplifier circuit connected in electrical communication with said sensor device, said first amplifier circuit comprising a first temperature sensitive resistor, said first amplifier circuit comprising a first operational amplifier;
   an attenuation network connected in electrical communication with an output of said first amplifier circuit, said attenuation network having a resistance which is alterable;
   a compensation circuit connected in electrical communication with said attenuation network, said compensation circuit comprising second and third operational amplifiers, said compensation circuit comprising second and third temperature sensitive resistors, said compensation circuit having a resistance which is alterable; and a differential amplifier connected in electrical communication with said attenuation network, said compensation circuit and a null set network, said null set network having a resistance which is alterable, said differential amplifier providing an output which is representative of the magnitude of said stimulus.

2. The apparatus of claim 1, wherein:
   said sensor device comprises a plurality of piezoresistive devices connected in a bridge arrangement.

3. The apparatus of claim 1, wherein
   said first temperature sensitive resistor is connected electrically between an inverting input and an output of said first operational amplifier.

4. The apparatus of claim 1, wherein:
   said second temperature sensitive resistor is connected electrically between an inverting input of said second operational amplifier and said attenuation network.

5. The apparatus of claim 1, wherein:
   said third temperature sensitive resistor is connected electrically between an inverting input of said third operational amplifier and an output of said second operational amplifier.

6. The apparatus of claim 1, wherein:

said first, second and third temperature sensitive resistors are disposed in a common semiconductor substrate.

7. The apparatus of claim 1, wherein:
said differential amplifier comprises a fourth operational amplifier.

8. The apparatus of claim 1, wherein:
said sensor device comprises first and second pairs of piezoresistive devices, each of said first and second pairs of piezoresistive devices being connected between a voltage source and an electrical ground, an inverting input of said first operational amplifier being connected between said first pair of piezoresistive devices, and a noninverting input of said first operational amplifier being connected between said second pair of piezoresistive devices.

9. The apparatus of claim 8, wherein:
said first and second pairs of piezoresistive devices and said first, second and third temperature sensitive resistors are all disposed in a common semiconductor material.

10. The apparatus of claim 1, wherein:
said differential amplifier comprises a fourth operational amplifier, a noninverting input of said fourth operational amplifier being connected to a circuit point having an effective input voltage potential equal to the average voltage of the output of said second operational amplifier and the output of the third operational amplifier.

11. The apparatus of claim 10, wherein:
said noninverting input of said fourth operational amplifier being connected between two resistive devices of said null set network, said two resistive devices having a combined resistive value which is alterable.

12. A pressure transducer, comprising:
a sensor device comprising a plurality of piezoresistors disposed in stress communication with a diaphragm;
a first amplifier network connected in electrical communication with said sensor device;
an attenuation network connected in electrical communication with said first amplifier network;
a compensation circuit connected in electrical communication with said attenuation network;
a second amplifier network connected in electrical communication with said attenuation network and said compensation circuit; and
a null set network connected in electrical communication with said second amplifier network.

13. The transducer of claim 12, wherein:
said plurality of piezoresistors are arranged in a bridge network between a voltage source and a circuit point of ground potential.

14. The transducer of claim 13, wherein:
said first amplifier network comprises a first operational amplifier and a first temperature sensitive resistor.

15. The transducer of claim 14, wherein:
said attenuation network comprises a plurality of trimmable resistors.

16. The transducer of claim 15, wherein:
said compensation network comprises second and third operational amplifiers and second and third temperature sensitive resistors, said second temperature sensitive resistor being connected to an inverting input of said second operational amplifier and said third temperature sensitive resistor being connected to an inverting input of said third operational amplifier.

17. The transducer of claim 16, wherein:
said second amplifier network comprises a fourth operational amplifier and a plurality of trimmable resistors.

18. The transducer of claim 17, wherein:
said null set network comprises a plurality of trimmable resistors.

19. The transducer of claim 18, wherein:
said first, second and third temperature sensitive resistors are implanted in a common semiconductor material with said plurality of piezoresistors.

20. A pressure transducer, comprising:
a sensor device comprising a plurality of piezoresistors arranged in a bridge network which is connected between a voltage source and a ground potential, said sensor device having first and second outputs;
a first amplifier network comprising a first operational amplifier and a first temperature sensitive resistor connected between an inverting input and an output of said first operational amplifier, said inverting input of said first operational amplifier being connected to said first output of said sensor device, a noninverting input of said operational amplifier being connected to said second output of said sensor device;
an attenuation network comprising a plurality of trimmable resistors connected between said voltage source and said ground potential, said attenuation network being connected to said output of said first operational amplifier;
a compensation circuit comprising second and third operational amplifiers and second and third temperature sensitive resistors, said second temperature sensitive resistor being connected to a inverting input of said second operational amplifier, said third temperature sensitive resistor being connected to an inverting input of said third operational amplifier, said second temperature sensitive resistor being connected to said output of said first operational amplifier, said third temperature sensitive resistor being connected to an output of said second operational amplifier, said compensation circuit comprising a first means for providing a first reference voltage connected to a noninverting input of said second operational amplifier and a second means for providing a second reference voltage connected to a noninverting input of said third operational amplifier;
a second amplifier network comprising a fourth operational amplifier, a noninverting input of said fourth operational amplifier being connected to an output of said third operational amplifier and said output of said second operational amplifier, an inverting input of said fourth operational amplifier being connected to said output of said attenuation network; and
a null set network comprising a plurality of trimmable resistors, an output of said null set network being connected to said noninverting input of said fourth operational amplifier, said first, second and third temperature sensitive resistors being disposed in a common semiconductor material with said plurality of piezoresistors.

* * * * *